United States Patent [19]

Quirk

[11] Patent Number: 5,264,491
[45] Date of Patent: Nov. 23, 1993

[54] COMPATIBILIZATION OF POLYMER BLENDS

[75] Inventor: Roderic P. Quirk, Akron, Ohio

[73] Assignee: Edison Polymer Innovation Corporation, Brecksville, Ohio

[21] Appl. No.: 935,650

[22] Filed: Aug. 26, 1992

Related U.S. Application Data

[63] Continuation of Ser. No. 497,450, Mar. 22, 1990, abandoned.

[51] Int. Cl.⁵ .................... C08G 63/181; C08G 63/20
[52] U.S. Cl. ...................................... 525/177; 525/90; 525/91; 525/146; 525/148; 525/176; 525/183; 525/184; 525/408; 525/409; 525/411; 525/413; 525/415
[58] Field of Search ......................................... 525/177

[56] References Cited

U.S. PATENT DOCUMENTS

| | | | |
|---|---|---|---|
| 3,055,952 | 9/1962 | Goldberg | 526/210 |
| 3,598,882 | 8/1971 | Brinkmann | 525/177 |
| 3,639,519 | 2/1972 | Hsich | 525/386 |
| 3,723,574 | 3/1973 | Brinkmann | 525/177 |
| 3,764,639 | 10/1973 | Hsich | 525/186 |
| 3,843,752 | 10/1974 | Katayama | 525/177 |
| 3,907,933 | 9/1975 | Foss | 525/186 |
| 4,101,522 | 7/1978 | Sheppard et al. | |
| 4,111,895 | 9/1978 | Gergen | |
| 4,202,949 | 5/1980 | Beck et al. | |
| 4,207,230 | 6/1980 | Bier | 525/177 |
| 4,217,427 | 8/1980 | Falk | 525/177 |
| 4,218,544 | 8/1980 | Henton | |
| 4,220,735 | 9/1980 | Dieck et al. | |
| 4,271,064 | 6/1981 | Dieck | |
| 4,639,481 | 1/1987 | Giles | |
| 4,785,053 | 11/1988 | Ito et al. | |
| 4,786,692 | 11/1988 | Allen et al. | |
| 4,804,711 | 2/1989 | Ishihara | 525/146 |
| 4,845,158 | 7/1989 | Peters | 525/177 |
| 4,851,474 | 7/1989 | Willis | 525/92 |
| 5,122,553 | 6/1992 | Takayama | 523/514 |
| 5,164,448 | 11/1992 | Mishima | 525/64 |

Primary Examiner—Patricia A. Short
Attorney, Agent, or Firm—Hudak & Shunk Co.

[57] ABSTRACT

Compatibilizing agents suitable for blending otherwise immiscible polymers comprise a block or graft copolymer in which at least one of the block segments is formed by a living anionic polymerization and thereafter chemically converted to provide a polymer having at least one functional end group. The functional groups of the polymer blocks thus formed are reacted with a functionalized monomer, or an oligomer to provide a second block polymer segment. Compatibilizing agents containing more than two blocks may be formed in similar fashion. The compatibilizing agents are used to provide uniform blends of polar and non-polar polymers having superior uniformity and other physical properties.

3 Claims, 2 Drawing Sheets

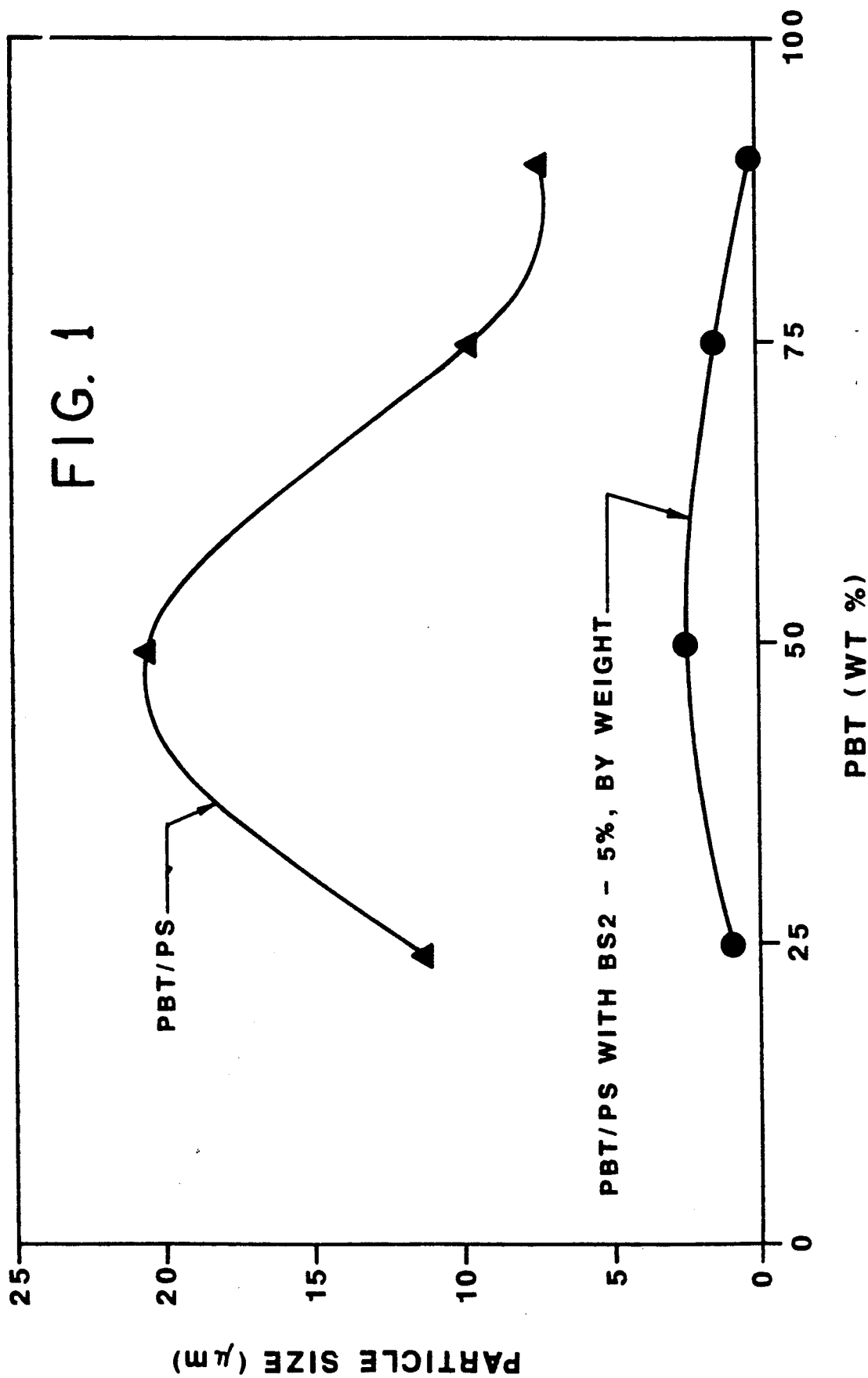

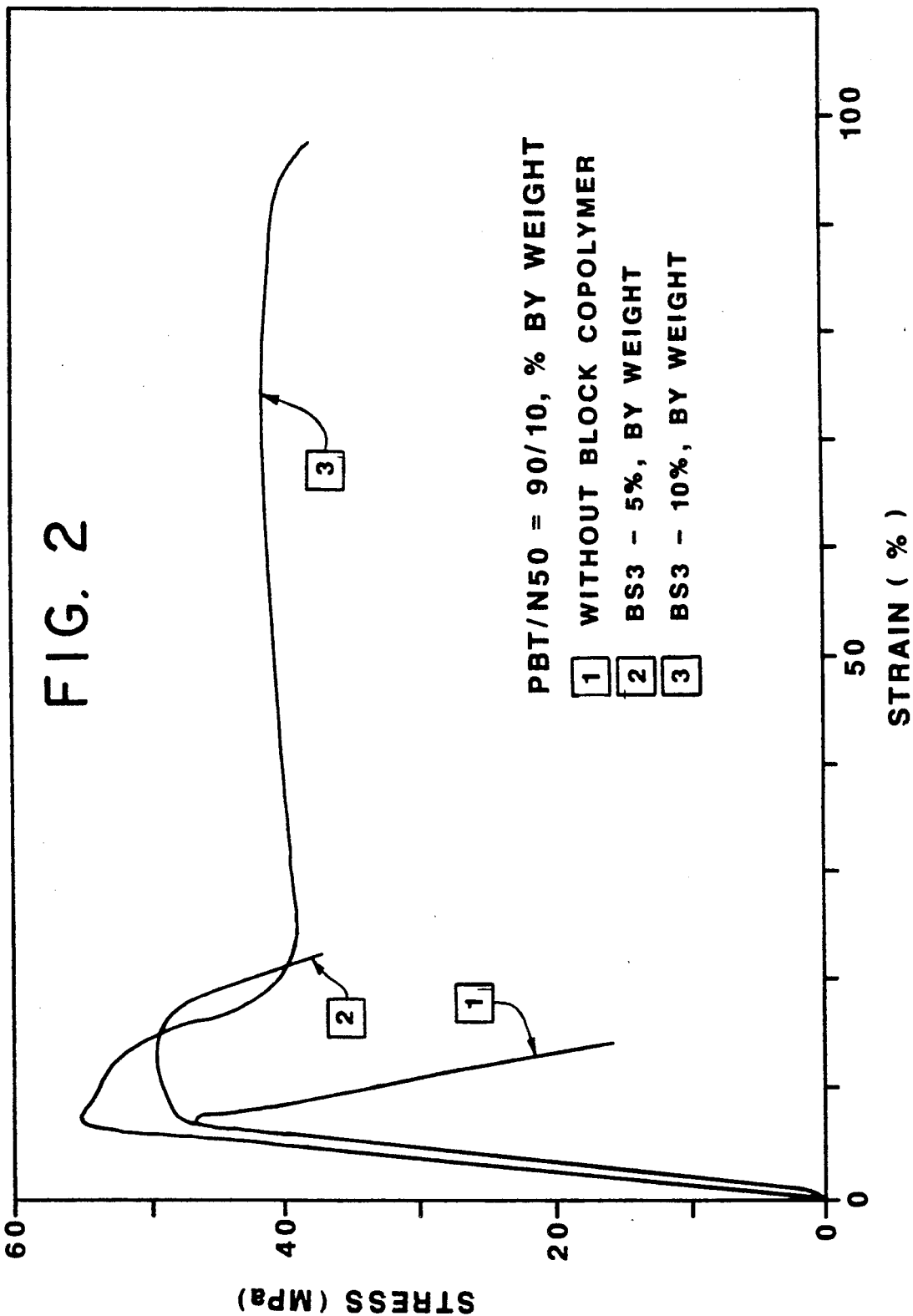

COMPATIBILIZATION OF POLYMER BLENDS

This application is a continuation of Ser. No. 497,450, filed Mar. 22, 1990, now abandoned.

TECHNICAL FIELD

This invention relates to the preparation of substantially uniformly dispersed polymer mixtures and blends of polymers. More particularly, this invention relates to the use of compatibilizing agents to blend otherwise immiscible polymers, and polymers having only limited miscibility. Specifically, this invention relates to the preparation of polymer blends by combining polymers having non-polar characteristics with polymers exhibiting polar characteristics, through the use of compatibilizing agents, and to methods for preparing such compatibilizing agents.

BACKGROUND OF THE INVENTION

For many end-use applications, there are few or no polymers available possessing the requisite properties to satisfy the applications for which they are needed. Furthermore, even when a polymer having suitable characteristics is known, it is sometimes not feasible to produce the polymer, due to the expense or the unavailability of the necessary raw materials, or because of the costs entailed in the synthesis. In such instances, resort is sometimes had to the preparation of blends of polymers, each of which contributes its individual characteristics to the whole, thus providing composite characteristics that meet the demands of the application.

Some polymer blends, for instance, have enjoyed widespread use due to their combined properties, for example, high-impact polystyrene and acrylonitrile/butadiene/styrene resins. In such systems, the desirable mechanical properties achieved are associated with graft-producing chemical reactions occurring at the interface of the polymer phases.

Unfortunately, the blending of polymers with suitable properties is frequently difficult to achieve due to the mutual incompatibility of the polymers. This results in immiscibility of the polymers and prevents uniformly dispersed polymer blends from being obtained. By way of example, polar polymers are substantially immiscible in non-polar polymers, making their blending difficult under normal circumstances. In this connection, the instability of the polymer blend phase morphology is believed to be a consequence of interfacial tension between the polymer phases, and in the absence of phase-behavioral modifying agents, the morphology of the polymer mixtures is to a substantial degree dependent upon the thermal and mechanical treatment to which the polymer mixtures have previously been subjected.

Polymer incompatibility has long been identified as a problem, and various methods have been proposed for circumventing it. For example, it has been recognized for some time that the incorporation of relatively small amounts of additional polymers, for instance, graft or block polymers, sometimes referred to as "compatibilizing agents", to binary blends of otherwise immiscible polymers tends to stabilize the phase morphology of the mixtures. In this regard, polystyrene/polyethylene graft and block copolymers have been used to make polyethylene/polystyrene blends. Similarly, polypropylene maleic anhydride graft copolymers have been employed to achieve satisfactory combinations of polypropylene and nylon-6, and polyethylene/polystyrene block copolymers have been added to polycarbonate/polyethylene melt blends. While such compatibilizing agents have been used in connection with the polymer mixtures described, the preparation of certain other desirable mixtures has previously been difficult or impossible to achieve, due to the fact that efficient compatibilization agents have up to now been unavailable.

BRIEF DESCRIPTION OF THE INVENTION

In view of the foregoing, therefore, it is a first aspect of this invention to facilitate the preparation of uniform polymer blends.

A second aspect of this invention is to provide compatibilizing agents that make possible the uniform blending of polymers whose previous combination has been difficult to achieve.

A further aspect of this invention is to make available methods for preparing compatibilizing agents useful in preparing polymer blends.

Another aspect of this invention is to produce substantially uniformly dispersed blends of polar polymers with non-polar polymers.

An additional aspect of this invention is to provide blends of polymers that exhibit more desirable properties relative to the properties of the individual polymers making up the blends.

A still further aspect of this invention is to provide compatibilizing agents that reduce the phase dimensions of the respective polymers, and that provide uniformly dispersed polymer mixtures.

Another aspect of this invention is to furnish polymer blends that display altered crystallinity and reduced melt flow.

Yet another aspect of this invention is to provide a way in which to synthesize block and graft copolymers designed to stabilize the morphology of polymer blends.

The preceding and other aspects of the invention are provided by a compatibilizing agent for polymer blends comprising a copolymer including a plurality of polymer blocks, at least one of said blocks being a non-polar block formed by an anionic polymerization, and at least one of said blocks being a polar block polymer selected from the group of polar block polymers formed by condensation polymerizations, and polar block polymers formed by ring-opening polymerizations.

The preceding and additional aspects of the invention are provided by a compatibilizing agent for polymer blends comprising a copolymer selected from a member of the group of a polystyrene-block-polyester, a polystyrene-block-polycarbonate, a polystyrene-block-nylon-6, a polyisoprene-block-polyester, and a polystyrene-block-polyisoprene-block-polyester.

The preceding and further aspects of the invention are provided by a substantially uniformly dispersed polymer blend comprising: a compatibilizing agent according to the penultimate paragraph; a polar polymeric component; and a non-polar polymeric component.

The preceding and still other aspects of the invention are provided by a process for preparing a compatibilizing agent for polymer blends comprising: (1) polymerizing a member selected from the group of styrene, an alkyl methacrylate, an alkylene oxide, a lactone, and a diene, in a living anionic polymerization to provide a first polymer having at least one stable anionic chain end; (2) converting the anionic chain ends into functional end groups by reacting said first polymer with an electrophilic compound; (3) converting said functional end groups into active polymerization-initiating sites; and (4) transforming said first polymer into a block copolymer by using said sites to initiate a polymerization of a type selected from a condensation polymerization and a ring-opening polymerization, thereby to produce a second polymer connected to said first polymer, said second polymer being a member selected from the group of a polyamide, a polyester, and a polycarbonate.

BRIEF DESCRIPTION OF THE DRAWINGS

The invention will be better understood when reference is had to the following Figures showing the effects of the compatibilizing agents of the invention in polymer blends and in which:

FIG. 1 is a plot showing a comparison of the particle size of the discontinous phase of a polymer blend containing a compatibilizing agent of the invention, relative to that of a blend containing no compatibilizing agent.

FIG. 2 is a stress/strain diagram comparing the effects of polymer blends with, and without compatibilizing agents of the invention, and showing the results of different levels of compatibilizing agents in the blends.

DETAILED DESCRIPTION OF THE INVENTION

While not wishing to be bound by the theory of the mechanism, it is speculated that uniform dispersions are achieved in otherwise incompatible, or only slightly compatible polymers, in a manner similar to the way in which soaps form emulsions in immiscible substances, e.g., oil and water. With respect to the invention described herein, block copolymer compatibilizing agents are provided, each of whose terminal block segments is miscible with one of the polymers to be blended. Consequently, while most polymer blends are immiscible and show heterogeneous, multi-phase morphology, attributed to the relatively large interfacial tensions between the phases, the terminal blocks contemplated by the block copolymers of the invention provide inter-phase "bridges", thereby "fastening" the non-continuous phase to the continuous phase. This prevents the discontinuous phase moieties from migrating to areas of coalescence, thus effecting a substantial reduction in the phase dimensions and providing more uniform dispersions.

FIG. 1 shows the substantial reduction in particle size obtainable in a representative polymer blend polystyrene, PS, with polybutylene terephthalate, PBT, when a compatibilizing agent of the type contemplated by the invention, polystyrene-block-polybutylene terephthalate, i.e., BS2 is incorporated therein, relative to the same polymer blend in which, however, no compatibilizing blend has been included. The plots compared are those expected from an examination of polymers and compatibilizing agents of the type described in connection with Example 1. The substantially reduced size of the dispersed phase in the polymer blends containing the compatibilizing agents of the invention, relative to blends in which no such agent is included, demonstrates the emulsification effect and stabilization of phase morphology achieved through addition of the agents.

The compatibilizing agents of the invention may be either block or graft copolymers, both of which are sometimes referred to herein as block copolymers, formed from any of various monomers and copolymers, including those described.

The compatibilizing block polymers of the invention may take the form of diblock (A-B) copolymers, triblock (A-B-C) copolymers, for example where the B block is difunctional, as in the case of telechelic polymerizations. Other forms of compatibilizing agents possible include block copolymers having more than three blocks, as well as "branched" copolymers of the form A-(B)$_2$, i.e., a form of graft copolymer.

The solubility of the terminal ends of the compatibilizing agents in the polymers to be combined determines the suitability of a particular compatibilizing agent for a particular blend of polymers. Where such suitability is not readily evident from the nature of the structures to be combined, it may be determined by simple empirical experimentation within the knowledge of those skilled in the art.

The block copolymers of the invention are formed by using anionic methods to produce at least one of the block segments in a so-called "living" polymerization that results in the formation of polymers with stable, anionic chain ends. These are subsequently converted into any of a broad group of functional end groups that can thereafter be reacted with difunctional monomers or oligomers to produce an attached second block segment by condensation polymerizations or ring-opening polymerizations. The use of an anionic polymerization, coupled with polymerization mechanism switching by means of the functional end groups yields novel block copolymers whose segments can be controlled to provide the overall polymer structure necessary for the applications envisioned.

One of the unique and important characteristics of living anionic polymerizations is their ability to provide polymer chains of whatever length is desired, and which have stable anionic chain ends that can be modified by various electrophilic reagents to provide a broad spectrum of functional end groups. The end-functionalized polymers thus formed can be used to generate active initiating sites for chain reaction polymerizations, for example, those of the radical, anionic, cationic, Ziegler-Natta, group-transfer, etc., types thereby permitting the formation of block copolymers by mechanism switching. In addition, the functional groups can serve as macromolecular monomers that can participate in block copolymer formation by means of the condensation polymerization of difunctional monomers having complementary functionality. The end-functionalized, anionically formed polymers are particularly suitable for subsequent combination with block segments formed by condensation and ring-opening polymerizations.

Providing the anionic polymerization reaction is protected from extraneous reactive material, termination of the reaction by transfer to a species not essential to the reaction can be avoided. Consequently, the polymer can be controlled to provide an extremely narrow distribution of whatever molecular weight polymer is determined desirable. As a result, polymerizations carried out by anionic living polymerization techniques provide significant flexibility in producing block copolymers displaying physical characteristics and solubilities desirable for the blends with which the copolymers are to be employed. The polymerization reaction is arrested by addition of a terminating or functionalizing agent, for example, water, alcohol, carbon dioxide, ethylene oxide, etc., at an appropriate point.

The compatibilizing agents of the invention are particularly useful in instances where polar polymers are to be employed in mixtures with non-polar polymers. In such cases, the terminal ends of the block copolymers will include at least one polar terminal group and one nonpolar terminal group. Among useful polar polymers may be mentioned polyesters, particularly alkylene polyesters, for example, polymers made from butylene terephthalate, ethylene terephthalate, butylene isophalate, ethylene isophalate, aromatic polyesters including those made from monomers such as para-hydroxy benzoic acid, and related compounds, various copolymers made from such compounds, polycarbonates, especially those made from bisphenol-A (polycarbonates), as well as polymers made from epsilon caprolactam, epsilon caprolactone, and various other monomers.

Among suitable non-polar polymers are those made from monomers such as arylvinyl compounds, for instance styrene, alkyl acrylates, including methyl methacrylate, alkylene oxides, lactones, dienes and substituted dienes, including derivatives thereof, for example, those formed by analog reactions, as well as others.

Suitable monomers, including those described in the preceding, are polymerized by methods well known in the art, some of which are described in the following examples, to the point at which the desired block copolymers are obtained. In addition, it has surprisingly been found that despite the relatively low amounts of compatibilizing agents present in the polymer blends of the invention, as is also described more particularly in the following, the molecular weight of the polymer block segments exerts a significant influence on the mechanical properties, for example, the tensile strengths of the polymer blends produced. Consequently, it is normally found desirable to determine empirically for a particular compatibilizing agent/blend system the molecular weight of the polymer blocks capable of producing the emulsifying effects and physical properties required. Within such considerations, however, it has been found to be of advantage to control the number average molecular weight, $M_n$, of the block segments making up the block copolymer compatibilizing agents between about 5,000 to about 50,000. In a preferred embodiment, however, such molecular weight will be controlled between about 10,000 to about 30,000. Generally speaking, increasing the molecular weight of the block segments has a tendency to transform brittle polymer behavior to more ductile behavior. Thus the control over molecular weight afforded by the anionic method of synthesizing segment blocks of the compatibilizing agents provides an unexpected way in which to desirably control the affect of the compatibilizing agent on the physical properties of the polymer blends, including their toughness.

The ratio of non-polar blocks to polar blocks in the block copolymers may vary; however, it has been found preferably that the number average molecular weight ratio of non-polar blocks to polar blocks be in the range from about 5 of the former, to 1 of the latter, on a weight basis, while in a preferred embodiment of the invention, the ratio will be about 2 to 1.

Generally, the process of preparing the compatibilizing agents of the invention involves the initial polymerization by anionic methods of the purified non-polar monomer by combining it with a suitable initiator, and preferably a solvent. The polymerization is continued until the desired molecular weight has been achieved, and the polymerization is thereafter functionalized, and terminated if necessary, by means of techniques well known in the art. Subsequently, the functionalized non-polar polymer is combined with polar monomeric constituents capable of reaction with the functional group of the non-polar material, and the former constituents are polymerized by condensation or ring-opening mechanisms, continued until the desired molecular weight of the polar polymer block has been achieved. The product is subsequently separated, and purified, if desired, before being used to compatibilize the polymers selected for blending. Diblock, triblock and other multiblock, including graft, copolymers can be formed in similar fashion, by employing known polymerization techniques.

While solution polymerizations in solvents such as aromatics, olefinics, aliphatics, ethers, amines, and the like, including such solvents as benzene, cyclohexane, pentane, etc., are preferred, bulk polymerizations can also be employed to prepare the block copolymers of the invention.

Initiators employed in the anionic polymerizations include alkyl lithiums and others of the types ordinarily employed for such polymerizations.

The functionalization of the non-polar polymer constituent may involve the formation of end groups such as hydroxy, carboxy, amines, thiols, their derivatives, and others, also using standard reaction techniques.

Polymerization times and temperatures will depend upon the materials being prepared and the molecular weights which it is desired to achieve, their extent either being commonly known, or readily determined by empirical means.

In those instances where it is desired to purify the compatibilization agents produced, methods such as, for example, selective precipitation may be resorted to. The technique involves sequential cycles of solution and subsequent precipitation of the impure product in an appropriate solvent, with unwanted components either being precipitated, or maintained in solution during each cycle. The cycles are repeated until the desired level of impurities has been achieved.

Following their preparation, the compatibilizing agents are combined with the polymers to be blended, and mixed at temperatures and for times necessary to achieve the level of dispersion desired, such conditions being controlled to avoid polymer degradation. Mixing may be carried out in a variety of equipment, including that commonly available to the Industry including kneaders, masticators, mixing rolls, extruders, and the like.

As indicated, the compatibilizing agents of the invention are particularly useful for blending polar polymers with non-polar polymers. Such polar polymers include polymers as, for example, polyesters, polyamides, polycarbonates, and others. Among these materials may specifically be mentioned polybutylene terephthalate, polyethylene terephthalate, polyisophthalates, various copolymers of such compounds, bisphenol-A (polycarbonate), nylon-6, poly(caprolactone), polyalkyl methacrylates mixtures of them, and additional polymers.

Included among suitable non-polar polymers are polyvinyl compounds, polydienes, and others. Such materials may comprise polystyrene, high-impact polystyrene, polystyrene with polyphenylene oxide, polycaprolactone, polycaprolactam, mixtures of such materials, as well as additional polymers.

As previously mentioned, the selection of a particular compatibilizing agent for a specific blend will be based upon the nature of the polymers to be blended relative to the terminal blocks of the compatibilizing agent, the selection being based upon similarities therebetween. Confirmation of the appropriateness of a particular selection may be determined empirically by experimental blending and subsequent examination of the resulting mixture for uniformity, all of which is within the skill of those familiar with the art.

Among others, suitable block copolymers include polystyrene-block-polyester, including polystyrene-block-polyalkylene terephthalate, polystyrene-block-polyalkylene isophthalate, and polystyrene-block-polyalkylene isophthalate/polyalkylene terephthalate copolymers, in which the alkene group is typically $C_2$ to $C_4$. Such blocks may, for example, be successfully used with blends of polystyrene and polybutylene terephthalate, polyphenylene oxide and polyethylene terephthalate. Block copolymers of polystyrene-block-polycarbonates, for example, polystyrene-block-polybisphenol-A (polycarbonate) may be used to prepare blends of mixtures of polystyrene and polyphenylene oxide with polybisphenol-A (polycarbonates). Block copolymers such as polystyrene-block-nylon-6 may be employed to create blends of polystyrene and nylon-6. High-impact polystyrene and blends of high-impact polystyrene with polyphenylene oxide may also be employed as non-polar polymer compatibilizing agent segments. Generally speaking, the compatibilizing agents of the invention may be used with any polymer, compatible with an end block of the agents.

The ratio of the polymers in the blends may be varied over the range of mixtures mathematically possible, and will depend upon the physical properties of the blend required for a particular application. The molecular weight of the polymers to be blended will also depend upon the physical properties of the blend required.

The amount of compatibilizing agent used in a blend will be governed to an important degree by the nature of the polymers to be blended, and by the physical properties of the blend desired. While relatively small amounts of a compatibilizing agent are needed to achieve homogeneous blends, unexpectedly, it has been found that the addition of significantly more than the small amounts required to control phase morphology contributes appreciably to the physical properties of the blend. Thus while as little as 2%, by weight, of the compatibilizing agent in the blend can produce uniform polymer mixtures, when the level of compatibilizing agent present constitutes at least about 7%, by weight, not only are reductions in phase dimensions commonly experienced, but improvements in physical properties, for example, greater tensile strengths, are achieved. Brittle behavior of the blends becomes ductile, and the blends experience improved toughening effects.

FIG. 2 is a stress/strain diagram confirming the disproportionate mechanical improvement obtained when the level of compatibilizing agent, polystyrene-block-polybutylene terephthalate/isorphthalate, i.e., BS3, is increased above about the 7%, be weight, level, for example, to about 10%, in a blend of polybutylene terephthalate, PBT, and polyphenylene oxide, PPO. In this regard, as can be seen from FIG. 1, relatively small amounts of the compatibilizing agents of the invention can profoundly affect particle size of the discontinuous phase, 5% in the case of FIG. 1. The same amount, while showing a modest improvement in physicals as is apparent from FIG. 2, does not have nearly the same physical affect as when the quantity of compatibilizing agent present is increased to the higher level. The results shown in the Figure are those expected from the polymers contemplated, for instance, by example 1.

In addition to the advantages previously mentioned, the use of the compatibilizing agents of the invention with the polymer blends described provides the ability to achieve more stable morphologies, as well as advantageous reductions in melt flow viscosities, and the capacity to desirably change the degree of crystallinity of the blends.

While not intended to be limiting in nature, the invention is illustrated by the following examples.

EXAMPLE 1

Preparation of Living Anionic Polymers

As previously indicated, anionic methods are used to produce at least one of the block segments in a "living" polymerization. Such polymers are thereafter functionalized so that they can be modified by the addition of a second block segment thereby producing the desired block copolymer.

For example, poly(isoprenyl))lithium or poly(-butadieyl))lithium is prepared in a living polymerization by initiating the polymerization of previously purified and dried isoprene or butadiene with sec-butyllithium. The reaction is carried out for one day in either cyclohexane or benzene, utilizing 10 vol % of monomer, in all-glass, sealed reactors using breakseals and standard high vacuum techniques, the reaction being carried out at 30° C. For instance, 50 grams of a polystyrene or polydiene block segment having a molecular weight of 10,000 grams per mole can be prepared by utilizing 50 gms. of the monomer in 500 mL of benzene and 5 mmoles, 3.4 mL, of a 1.47M solution of sec-butyllithium in cyclohexane.

A diblock living polymerization may also be utilized to form the initial component of the block copolymers of the invention, for example, by polymerizing styrene previously purified and dried with sec-butyllithium initiator in a 12 hour reaction employing benzene as the solvent, and 10% by vol of monomer. As previously described, the reaction is carried out at 30° C. in an all-glass, sealed reactor using breakseals and standard high vacuum techniques. Previously purified and dried butadiene, 29 mL, is then added to this solution of poly(-styryl)lithium, $2.1 \times 10^{-3}$ mole., by means of an ampoule, and the block polymerization is allowed to proceed for 18 hours at 25° C. The flask is periodically cooled with ice water during the final stages to promote complete consumption of the butadiene.

Functionalization of Polymers

As described, a variety of functionalized polymers are possible among which may be mentioned the following.

A four-fold molar excess of previously purified and dried ethylene oxide is dissolved in benzene and added by means of an ampoule to a benzene solution of poly(-styryl)lithium, or poly(dienyl)lithium, and the contents allowed to stand for 12 hours. The benzene solution of the products is thereafter hydrolyzed with methanol containing aqueous hydrochloric acid, 1 wt %, followed by precipitation of the resulting functionalized polymer into methanol. The hydroxyl-terminated polymer is isolated either by decantation, in the case of a polydiene, or by collection on a Buchner funnel, in the case of polystyrene.

Similarly, a carboxyl-terminated polymer can be prepared by purifying and drying tetrahydrofuran and adding the material in an amount corresponding to 25 vol % of a benzene solution of poly(styryl)lithium or poly(dienyl)lithium. High purity carbon dioxide is then introduced into the unstirred, partially evacuated solution of poly(styryl)lithium or poly(dienyl)lithium, through a breakseal. The resulting solutions of polymeric carboxylate salts are thereafter hydrolyzed with methanol containing aqueous hydrochloric acid, 1N, followed by precipitation of the resulting carboxyl-terminated functionalized polymer into methanol. The polymer is isolated either by decantation in the case of a polydiene, or by a collection on a Buchner funnel in the case of polystyrene.

An amine-functionalized polymer is obtained by adding a benzene solution of a two molar excess of N-(benzylidene)trimethylsilylamine, utilizing a breakseal, to a benzene solution of poly(styryl)lithium or poly(dienyl)lithium. After stirring the mixture for 12 hours, the reaction is quenched with methanol. The polymer products are isolated by precipitation with methanol, and the amination products are hydrolyzed by the addition of 20 mL of 6N aqueous hydrochloric acid to a benzene solution of the polymer, and heating the mixture at reflux conditions for 3 hours. The benzene solution is then washed successively with saturated, aqueous sodium bicarbonate and water, and precipitated in methanol. The amine-functionalized polymer is isolated either by decantation as with a polydiene, or by collection on a Buchner funnel in the case of polystyrene.

Phenol-terminated polymers are also possible by employing a benzene solution of a 0.2 molar excess of 1-(4-tert-butyldimethylsiloxyphenyl)-1-phenylethylene. The solution is added to a benzene solution of poly(styryl)lithium through a breakseal. After the reaction proceeds for three days, it is quenched with degassed methanol. The functionalized polystyrene is then isolated by precipitation with excess methanol and dried in a vacuum oven. The silyl protecting group is thereafter removed by hydrolysis of the polymer using 1% hydrochloric acid in tetrahydrofuran under reflux conditions for 3 hours. The resulting phenol-terminated polystyrene is isolated by precipitation into excess methanol, followed by filtration and drying.

The analogous functionalization of polystyrene-block-poly(butadienyl)lithium is effected using a 0.5 molar excess of 1-(4-tert-butyldimethylsiloxyphenyl)-1-phenylethylene, following addition of 21 mL of tetrahydrofuran to 600 mL of the benzene solution of the polymer. The reaction is quenched after 12 hours and worked-up in a procedure analogous to that described in the case of the phenol-terminated polystyrene.

Preparation of Styrene-Butylene Terephthalate (or Terephthalate/Isophthalate) Block Copolymer Polystyrene, PS, polybutylene terephthalate, PBT, block copolymer and polystyrene-butylene terephthalate/isophthalate, PBTI, block copolymer are prepared in the following manner.

Terephthaloyl chloride is recrystallized from dried hexane, and isophthaloyl chloride is distilled under vacuum. The butane diol is dried over 3A molecular sieves and distilled under vacuum. 1,2,4-Trichlorobenzene (TCB) is used without further purification.

Hydroxy terminated polystyrene, PSOH, is prepared by an anionic polymerization technique employing sec-butyllithium-initiated anionic polymerization of previously purified sytrene in benzene, carried out at 30° C. in an all-glass, sealed reactor using breakseals and standard high vacuum techniques. After 12 hours, excess ethylene oxide (4-fold excess) is dissolved in benzene and added through a breakseal, the contents being left overnight at room temperature. The benzene solution of the product is hydrolyzed with methanol containing aqueous HCl (1 wt %), followed by precipitation of the polymer into methanol. Thin layer chromatographic analysis (TLC) using toluene as the eluent shows only one peak for the hydroxy functionalized styrene polymer, i.e., no spot corresponding to unfunctionalized polystyrene being observed. Analogous TLC analysis of a sample of the functionalized polymer after doping with 1 wt % of unfunctionalized polystyrene base polymer shows two spots, indicating that the functionalized polymer sample has less than 1 wt % of unfunctionalized polymer impurity.

The concentration of hydroxyl chain ends is determined as described in ASTM E222-73 using acetic anhydride in pyridine, followed by titration of acetic acid with 0.1N sodium hydroxide. Vapor pressure osmometry measurements are made at 37° C. using a Knauer-type 11.00 Vapor Pressure Osmometer with chloroform as the solvent, and sucrose octacetate as the calibration standard. The hydroxy terminated polystyrenes prepared are summarized in Table 1 below.

35 g (0.172 mol) of terephthaloyl chloride (or terephthaloyl chloride and isophthaloyl chloride 1/1 mixture), and 100 ml TCB are added to a 250 ml three-neck round bottle flask fitted with a nitrogen inlet and outlet, a magnet stirrer, a dropping funnel, and a condenser, and allowed to reflux.

15 g of hydroxy terminated polystyrene and 100 ml TCB solution are then introduced dropwise into the reactor over a period of 3 hours. After refluxing for an hour, 10.9 g (0.175 mol) of butanediol is slowly added. The contents are refluxed at about 214° C. for 10 hours, and the crude styrene-butylene terephthalate (or styrene-butylene terephthalate/isophthalate) condensation product is thereafter precipitated in an excess of methanol and dried in a vacuum oven for 24 hours.

Preparation of Styrene-Ethylene Terephthalate Block Copolymer

Dimethyl terephthalate is recrystallized from dried ethanol. 30 g (0.154 mol) of the dimethyl terephthalate and 30 ml of TCB are added to a 250 ml three-neck round bottom flask fitted with a nitrogen stream inlet and outlet, a magnet stirrer, a dropping funnel, and a condenser, and heated to about 190° C. 20 g of hydroxy-terminated polystyrene, 70 ml of TCB, and 2 ml of catalyst solution (titanium butoxide, magnesium acetate, methanol, and butanediol solution) are introduced dropwise into the reactor over 3 hours. After refluxing for one and one-half hours and confirming the absence of hydroxy-terminated polystyrene by thin layer chromotography analysis, the reactor is cooled to below 190° C., and 10.54 g (0.170 mol) of ethylene glycol is added. The contents are kept refluxing at about 214° C. for 10 hours while maintaining a nitrogen stream purge. The reaction mixture is thereafter cooled, and the crude styrene-ethylene terephthalate product precipitated in excess methanol before being dried in a vacuum oven for 24 hours. The crude condensation product is finally extracted with cyclohexane for 12 hours to remove unreacted or chain unextended polystyrene.

The intrinsic viscosity of the products is measured in a 50/50 (wt %) phenol/1,1,2,2-tetrachloroethane solution at 25° C.

The compositions of the block copolymers are determined by Fourier Transform Infrared (FTIR) spectroscopy using a calibration curve based on polystyrene and polyethylene terephthalate blends. The block copolymers are purified by extracting homo-polyester with selective precipitation, using phenol as a solvent, and water as a precipitant. Experimental conditions and the results of the polycondensation, including yield, viscosity of the products, etc., are summarized in Table 1.

TABLE 1

CHARACTERISTICS OF BLOCK COPOLYMERS

| Run No. | PSOH | RC(=O)—C6H4—CR(=O) | Diol | Feed Ratio PS/Ester | Yield | Crude Product [n] (dl$^a$/g) | PS/Ester | Unreacted PS (%) |
|---|---|---|---|---|---|---|---|---|
| 1 | PSOH1$^{b)}$ | R=Cl | EG | 27/73 | 79.6 | 0.116 | 34/66 | 16.3 |
| 2 | PSOH2$^{c)}$ | R=Cl | BD | 28/72 | 96.0 | 0.626 | 33/67 | 4.0 |
| 3 | PSOH2 | R=Cl$^{d)}$ | BD | 38/62 | 95.0 | 0.647 | 50/50 | 3.2 |
| 4 | PSOH3$^{e)}$ | R=OMe | EG | 40/60 | 87.6 | 0.225 | 44/56 | 12.1 |
| 5 | PSOH3 | R=OMe | EG & BD$^{f)}$ | 38/62 | 89.4 | 0.366 | 54/46 | 20.1 |

$^{a)}$phenol/1,1,2,2-tetrachloroethane = 50/50 (wt %) mixture at 25° C.
$^{b)}\overline{M}_n$ = 29,300 gms/mole
$^{c)}\overline{M}_n$ = 20,000 gms/mole
$^{d)}$tere- and iso-phthaloyl chloride 50/50 mixture
$^{e)}\overline{M}_n$ = 21,000 gms/mole
$^{f)}$ethylene glycol (EG) and butane diol (BD) 50/50 (mol %) mixture

Representative Blend Preparations

Polystyrene (PS) and polyphenylene oxide (PPO) are dissolved in toluene (concentration about 10%) precipitated in an excess of methanol, and then dried in a vacuum oven for 24 hours. Examples of compositions thus prepared are listed in Table 2. These mixtures show a single $T_g$ (glass transition temperature), as indicated in the Table. The uncompatibilized mixtures of the Table are subsequently combined with the compatibilizing agents set forth in Table 3, as is described in more detail below.

TABLE 2

PPO-PS UNCOMPATIBILIZED BLENDS PREPARED

| Designation | Composition (% by wt.) | | $T_g$(°C.) |
|---|---|---|---|
| | PPO | PS | |
| N2O | 20 | 80 | 120.3 |
| N5O | 50 | 50 | 154.5 |
| PS | — | 100 | 96.7 |
| PPO | 100 | — | 219.0 |

TABLE 3

COMPATIBILIZING AGENT

| Sample No. | | PS Segment $\overline{M}_n$ | wt % | I.V. (dl/g) | Purity % |
|---|---|---|---|---|---|
| BS1 | PS-b-PBT | 9,400 | 46 | 0.527 | 75 |
| BS2 | PS-b-PBT | 29,300 | 65 | 0.626 | 50 |
| BS3 | PS-b-PBTI | 21,000 | 60 | 0.647 | 80 |

Blends of PBT and PS with BS compatibilizing agents are prepared using a Haake Buchler Rheocord with Banbury rotors at 250° C. for 5 minutes and 50 rpm. The blends are subsequently compression molded to form tensile bars in a Wabash compression molding press at 260° C.

The compositions and mixing temperatures of typical compatibilized blends are listed in Table 4.

TABLE 4

COMPATIBILIZED BLEND SYSTEMS

| Blend System | Composition (% by wt.) | | | | | Temp. (°C.) |
|---|---|---|---|---|---|---|
| PBT/PS/BS | 90/10/5 | 90/10/10 50/50/5 | 75/25/5 25/75/5 | 75/25/10 | 75/25/25 | 250 |
| PBT/N20/BS | 90/10/5 | 90/10/10 50/50/5 | 70/25/5 25/75/5 | 75/25/10 | 75/25/25 | 260 |
| PBT/N50/BS | 90/10/5 | 90/10/10 50/50/5 | 75/25/5 25/75/5 | 75/25/10 | 75/25/25 | 270 |
| PBT/HIPS*/BS | 90/10/5 | 90/10/10 25/75/5 | 75/25/5 | 75/25/10 | 50/50/5 | 250 |

*High-impact polystyrene

Tensile Testing

Stress-strain curves in the tensile mode at room temperature, of the type shown in FIG. 2, are obtained by Monsanto Tensile Tester T-10 at a cross head speed of 5 mm/minute.

Scanning Electron Microscopy

Blend samples prepared in various ways, including dumbbell specimens, are fractured in liquid nitrogen and coated with gold/palladium. The fractured surfaces are observed in an ISI Scanning Electron Microscope SX-40 (SEM). The number average size dispersed phase for various blends, as shown in FIG. 1, is calculated from SEM photomicrographs.

EXAMPLE 2
Preparation of Polystyrene/Polybutadiene/Polycarbonate Triblock Copolymer To a 500 ml flask containing 43 ml of dry DMF is added 32.2 g (0.159 mol) of 4-hydroxybenzophenone, 34.3 g (0.19 mol) of butyldimethylsilylchloride, and 51.4 g of imidazole. The reaction mixture is stirred for 4 hours at 45° C., 200 ml of hexane is added, the solution is washed 5 times with 5% $NaHCO_3$ solution, and the solvent is evaporated using a Rotovapor, a rotary evaporator. Distillation under reduced pressure gives 49.4 g (94.7% yield) of a clear liquid, 4-(tert-butyldimethylsiloxy)benzophenone, Compound I.

70 ml (0.21 mol) of a 3M solution of $CH_3MgBr$ in ether is then placed in a 500 ml three-necked flask under argon atmosphere. After the solution has cooled to 0°–5° C., 49.4 g of Compound I in 100 ml of dry THF is added dropwise over 70 minutes, and then stirred for 90 minutes at room temperature. The mixture is again cooled and treated with 15 g of ammonium chloride in 70 ml of water. The ether layer is decanted into a separatory funnel, and the pasty layer is extracted two times with ether. After most of the solvent has been evaporated with the Rotovapor, the residue is distilled under high vacuum. The resulting carbinol distills at 154°–160° C. as a clear liquid.

To the carbinol is then added 1 g of potassium bicarbonate, and the mixture is dehydrated under high vacuum. Redistillation yields 45.3 g (97.0% yield) of a clear liquid, a 126°–127° C. boiling fraction. TLC and NMR analysis indicates that no detectable impurities exist in the product.

To this product is added dibutyl magnesium solution until the solution develops a red color. The product, 4-(tert-butyldimethylsiloxyphenyl)-1-phenylethylene is then separated by distillation and ampulated under high vacuum.

Styrene and benzene are thereafter purified by standard procedures, and polystyryllithium is synthesized at room temperature. GPC analysis shows that its molecular weight is $7.3 \times 10^3$, and that it has a relatively narrow molecular weight distribution.

5 ml of n-butyllithium is placed in a 100 ml flask maintained under an argon atmosphere. The flask is then sealed and the solvent evaporated under high vacuum. To this flask is added about 50 ml of butadiene at $-78°$ C., and the contents is stirred for 9 hours at $-78°$ C. 29 ml of butadiene is then distilled from the flask to an ampule, and the dry ice cooling bath employed for cooling is removed from the ampoule. After breaking the breaksealing, the red color of polystyryllithium immediately changes to a very light yellow color. The contents are reacted for 18 hours at room temperature. During the final several hours the flask is cooled and then heated to room temperature several times in order to dissolve the butadiene present as a gas phase in order to complete the reaction of butadiene.

1.5 ml ($4.6 \times 10^{-3}$ mol) of Compound I in 21 ml of THF is then added to the polymer solution. The solution immediately changes to a red color and gradually becomes dark red. After 12 hours reaction at room temperature methanol is added to yield the protected phenol-terminated polystyrene-block-polybutadiene. The latter material is thereafter refluxed for 3 hours in THF containing 1% HCl to provide the desired phenol-terminated polystyrene/polybutadiene diblock copolymer.

EXAMPLE 3
Preparation of Polystyrene/Nylon 6 Block Copolymers

N-Methacryloylcaprolactam 74 g of $\epsilon$-caprolactam in 700 ml dry toluene is heated with 9.5 g of sodium at 90°–95° C. When all of the sodium metal has reacted, 43 ml of methacryloyl chloride in 50 ml dry benzene is added dropwise into the voluminous caprolactam salts at 4°–6° C. The mixture is then poured into a separatory funnel, washed with 200 ml water, 200 ml of sodium dicarbonate solution, and again with 20 ml water. The organic compounds are extracted with ether from the water phase, and the ether solution and benzene solution are dried over $CaCl_2$ and the solvent evaporated under reduced pressure. The product, N-methacryloylcaprolactam, comes off at 90° C./2 mm hg. The yield is 32.3 g (42.8% based on sodium).

NMR values (ppm) are shown to be:
$^1$H: 1.64 (m, $-(CH_2)_3-$), 1.82 (s, $-CH_3$). 2.52

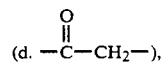

3.67 (d, $-N-CH_2-$), 5.04 (d, $H_2C=C$);
$^{13}$C: 19.07, 23.63, 29.07, 29.88, 38.93, 44.15, 116.21, 143.6, 175.6, 178.14.

1,1-dinaphthylethylene 10.9 g (0.45 atoms) of magnesium turnings is placed in a one liter, three-necked flask. About 40 ml mixture of 99.2 g (0.47 mols) of bromonaphthalene, 300 ml of dry ethyl ether, and 150 ml of dry benzene is added, and the flask is warmed gently until the reaction becomes rapid. The resulting solution is stirred for 30 minutes.

After cooling the flask in ice water, 17.6 g (0.2 mol) of anhydrous ethyl acetate in 30 ml of ether is added over a one-hour period, then stirred for 50 minutes at room temperature. To decompose the magnesium compound, the flask is cooled again in ice water, and 10 ml solution of 25% ammonium chloride is slowly added.

The ether layer is decanted into a separatory funnel, and to it is added the ether extract of the pasty residue. The ether is removed by a Rotavapor, and to the residue is added 2 g of solid $KHSO_4$. Distillation under high vacuum gives viscous, yellowish 1,1-dinaphthylethylene. The crude product is recrystallized in acetic acid and further in cyclohexane. The yield is 16.9 g (30.2% based on ethyl acetate).

NRM values (ppm) are as follows: $^1$H: 5.9, 7.4, 7.8, 8.3; $^{13}$C: 122.4, 125.8, 126.2, 126.4, 126.7, 127.5, 128.5, 129.0, 131.8, 134.7, 141.5, 147.5.

UV absorbence (nm): 240, 294.
IR absorbence ($cm^{-1}$): 775.7, 802.7, 901.3, 1398.6, 1506.3, 1588.8, 3008.0, 3058.2, 3084.1.

Polystyrene Base Polymer

Styrene, toluene, benzene and tetrahydrofuran are purified according to standard procedures. All polymerizations being carried out in sealed glass reactors, using breakseals and high vacuum techniques. After anionic polymerization, a living polystyrene block aliquot is withdrawn in order to determine its molecular weight and active end group concentration.

Functionalization

An acyl lactam-functionalized polymer can be prepared by adding a toluene solution of a 0.1 molar excess of 1,1-bis(1'-naphthyl)ethylene to a benzene solution of poly(styryl)lithium at 25° C., using a breakseal. After the crossover reaction is complete, requiring approximately 1 day, as monitored by ultraviolet-visible absorption spectroscopy at 500 nm, the resulting polymeric 1,1-dinaphthylalkyllithium is cooled to −78° C. and then reacted with a 0.4 molar excess of N-methacroylcaprolactam dissolved in tetrahydrofuran. The reaction is terminated after 10 minutes by the addition of methanol.

Polystyrene/Nylon-6 Block Copolymer

In yet another experiment, polystyrene-block-nylon 6 is synthesized by utilizing a living acyl lactam-terminated polystyrene of the type previously described. In the experiment, the living acyl lactam-terminated polystyrene, 74 g, $M_n = 9.8 \times 10^3$ g/mole, having a temperature of −78° C., and contained in a mixture of toluene and tetrahydrofuran, is treated directly with 5 grams of caprolactam in tetrahydrofuran solution and maintained at −78° C. for 12 hours. The solution is then slowly warmed to room temperature, and 92.5 g of caprolactam in 460 mL of tetrahydrofuran is added, followed by heating of the mixture to 40° C. After 48 hours, the resulting block polymer is isolated by precipitation in methanol. The weight ratio of nylon-6 to styrene is estimated to be 1.48, utilizing the infra-red absorption band at 1642 cm$^{-1}$. The conversion of caprolactam is 93.2%, based on the weight of the polymer product.

EXAMPLE 4

Polystyrene/polycarbonate Block Copolymer

In a further experiment, a polystyrene-block-polycarbonate diblock copolymer is prepared in the following manner.

To a 500 ml three-necked flask equipped with mechanical stirrer, a dropping funnel, and a distilling head connected to a dry ice-acetone trap is added 20 mL of a solution of 20% phosgene in toluene. The solution is cooled in an ice bath, followed by the slow addition over a period of 2 hours of 6.6 grams, $5 \times 10^{-4}$ mol, of phenol-terminated polystyrene having a number-average molecular weight, $\overline{M}_n$, of $1.3 \times 10^3$ g/mole, to a mixture of 85 mL of methylene chloride and 3 mL of pyridine with vigorous stirring. The mixture is stirred for 30 minutes in an ice bath, and the excess phosgene is thereafter removed by heating to 50° C. and stripping the mixture with a nitrogen stream for 30 minutes.

The residue is then cooled in an ice bath and a mixture of 16.7 g, 72 mmoles, of bisphenol-A and 9 mL of pyridine in 85 mL of methylene chloride is added under a nitrogen atmosphere with stirring. After solution of the bisphenol-A, 52 mL of phosgene solution, 20% by wt in toluene, is slowly added to the reaction mixture, with cooling to keep the temperature below 30° C. At the midpoint of the reaction, pyridine hydrochloride is observed to precipitate, and the solution viscosity increases to produce a thick slurry. The temperature is increased to 45° C. and the phosgene addition is continued. The excess phosgene is thereafter removed by heating to 50° C., accompanied by nitrogen gas stripping for 1 hour.

The resulting polymer solution is diluted with 100 mL of methylene chloride, washed several times with water and the resulting polymer precipitated by addition to methanol. The yield of polymer is 23.6 g, 94.3%. Size exclusion chromatographic analysis indicates that almost no polystyrene homopolymer remains in the product, and that the apparent molecular weight of the block polymer is $3.2 \times 10^4$ g/mole using a polystyrene calibration curve. HNMR analysis of the block copolymer in chloroform solution indicates that the weight ratio of the polycarbonate segment to the polystyrene segment is 2.29, based on the integration ratio of the area corresponding to the methyl protons of bisphenol-A residues at 1.65 ppm to the area of the meta aromatic protons of polystyrene at 6.55 ppm.

While in accordance with the patent statutes, a preferred embodiment and best mode has been presented, the scope of the invention is not limited thereto, but rather is measured by the scope of the attached claims.

What is claimed is:

1. A linear diblock compatibilizing agent for polymer blends whose block segments have an $M_n$ of about 21,000 to 30,000 comprising a copolymer selected from a member of the group of a polystyrene-block-aromatic polyester and a polyisoprene-block-aromatic polyester, said polystyrene and said polyisoprene being prepared by living anionic polymerization using an alkyllithium initiator, and said aromatic polyester being selected from a member of the group consisting of polyethylene isophthalate, polyethylene terephthalate, polybutylene isophthalate, polybutylene terephthalate, and copolymers formed between the preceding.

2. A process for preparing a linear diblock compatibilizing agent for polymer blends whose block segments have an $M_n$ of about 21,000 to 30,000 comprising: (1) polymerizing a member selected from the group consisting of styrene and isoprene in a living anionic polymerization in the presence of an alkyllithium initiator to form a first polymer having a stable anionic chain end; (2) converting the anionic chain end into a functional end group by reacting said first polymer with an electrophilic compound (3) converting said functional end group into an active polymerization-initiating site; and (4) converting said first polymer into a linear diblock copolymer by using said site to initiate a condensation polymerization to produce a second polymer, said second polymer being an aromatic polyester selected from the group consisting of polyethylene isophthalate, polyethylene terephthalate, polybutylene isophthalate, polybutylene terephthalate, and copolymers formed between the preceding.

3. A process according to claim 2 wherein said functional end groups are selected from a carboxy group, an amine group, a thiol group, a hydroxyl group, and a phenol group, and wherein said groups are converted into said active site in a subsequent reaction.

* * * * *